United States Patent
Casoni et al.

(10) Patent No.: US 12,434,093 B2
(45) Date of Patent: Oct. 7, 2025

(54) TREADMILL WITH AXIAL ELECTRIC MOTOR

(71) Applicant: Technogym S.P.A, Cesena (IT)

(72) Inventors: Massimiliano Casoni, Cesena (IT); Alessandro Del Monaco, Cesena (IT); Davide Gatti, Cesena (IT)

(73) Assignee: Technogym S.p.A, Cesena (IT)

( * ) Notice: Subject to any disclaimer, the term of this patent is extended or adjusted under 35 U.S.C. 154(b) by 986 days.

(21) Appl. No.: 16/976,094

(22) PCT Filed: Feb. 27, 2019

(86) PCT No.: PCT/IT2019/050044
§ 371 (c)(1),
(2) Date: Aug. 27, 2020

(87) PCT Pub. No.: WO2019/167096
PCT Pub. Date: Sep. 6, 2019

(65) Prior Publication Data
US 2021/0086026 A1   Mar. 25, 2021

(30) Foreign Application Priority Data
Feb. 28, 2018   (IT) .......................... 102018000003113

(51) Int. Cl.
| A63B 22/02 | (2006.01) |
| H02K 7/00 | (2006.01) |
| H02K 21/24 | (2006.01) |

(52) U.S. Cl.
CPC ...... *A63B 22/0235* (2013.01); *A63B 22/0242* (2013.01); *H02K 7/003* (2013.01); *H02K 21/24* (2013.01)

(58) Field of Classification Search
CPC ...... A63B 22/02–0292; A63B 22/0235; A63B 21/00192; A63B 21/0058; A63B 21/0059;
(Continued)

(56) References Cited

U.S. PATENT DOCUMENTS

| 5,607,376 A | * | 3/1997 | Magid | ....................... B62B 7/12 |
| | | | | 482/69 |
| 5,619,087 A | | 4/1997 | Sakai | |
| | | (Continued) | | |

FOREIGN PATENT DOCUMENTS

| CN | 102107064 | 6/2011 |
| CN | 202183716 | 4/2012 |
| | (Continued) | |

OTHER PUBLICATIONS

Decision of Examination Dated Aug. 18, 2022 From the Intellectual Property Office, Ministry of Economic Affairs of the Republic of Taiwan, R.O.C. Re. Application No. 11120697990. (12 Pages).
(Continued)

*Primary Examiner* — Loan B Jimenez
*Assistant Examiner* — Kathleen M Fisk

(57) ABSTRACT

A gymnastic machine including a base structure having a front transmission assembly and a rear transmission assembly, wherein the base structure includes two lateral longitudinal members between which a sliding belt slides, a sliding belt, associated to the base structure, on which a user can perform a gymnastic exercise, wherein the sliding belt is configured to rotate by means of the front transmission assembly and rear transmission assembly according to a sliding direction, wherein the sliding belt is arranged between the two lateral longitudinal members and an electric axial motor, having at least one stator and at least one rotor, the electric axial motor being kinematically coupled to the front transmission assembly, or to the rear transmission assembly, for moving the sliding belt, the electric axial motor being of axial type.

1 Claim, 8 Drawing Sheets

(58) Field of Classification Search
CPC .... A63B 21/0051; H02K 7/003; H02K 7/116; H02K 7/14; H02K 21/24; H02K 16/02–025
See application file for complete search history.

(56) References Cited

U.S. PATENT DOCUMENTS

| | | | | |
|---|---|---|---|---|
| 6,302,826 | B1* | 10/2001 | Lee | A63B 22/02 |
| | | | | 482/54 |
| 6,455,960 | B1* | 9/2002 | Trago | H02K 9/227 |
| | | | | 310/67 R |
| 6,575,879 | B1* | 6/2003 | Harney | A63B 22/02 |
| | | | | 473/441 |
| 6,879,078 | B2* | 4/2005 | Wolters | H02K 1/2791 |
| | | | | 310/216.074 |
| 7,362,016 | B2* | 4/2008 | Cheng | A63B 22/025 |
| | | | | 310/58 |
| 7,618,352 | B1* | 11/2009 | Wei | A63B 22/0257 |
| | | | | 482/54 |
| 8,282,535 | B2* | 10/2012 | Huang | B65G 39/09 |
| | | | | 482/54 |
| 10,093,487 | B2* | 10/2018 | Ramezani | H02K 1/02 |
| 10,238,911 | B2* | 3/2019 | Bayerlein | A63B 23/04 |
| 10,554,082 | B2* | 2/2020 | Watanabe | H02K 16/02 |
| 11,123,602 | B2* | 9/2021 | Kueker | A63B 22/0235 |
| 2010/0331148 | A1* | 12/2010 | Huang | B65G 39/09 |
| | | | | 482/54 |
| 2012/0133231 | A1* | 5/2012 | Hayakawa | H02K 16/00 |
| | | | | 310/156.37 |
| 2013/0049512 | A1* | 2/2013 | Jung | H02K 21/24 |
| | | | | 310/156.36 |
| 2016/0308411 | A1* | 10/2016 | Watanabe | H02K 21/24 |
| 2017/0170706 | A1 | 6/2017 | Bhargava et al. | |
| 2017/0305676 | A1* | 10/2017 | Ramezani | B65G 13/06 |
| 2018/0001134 | A1* | 1/2018 | Bayerlein | A63B 22/0285 |
| 2019/0217182 | A1* | 7/2019 | Kueker | A63B 22/0235 |
| 2021/0001168 | A1* | 1/2021 | Casoni | A63B 21/0058 |
| 2021/0086026 | A1 | 3/2021 | Casoni et al. | |

FOREIGN PATENT DOCUMENTS

| | | |
|---|---|---|
| CN | 207871377 | 9/2018 |
| TW | 463644 | 11/2001 |
| TW | 200642717 | 12/2006 |
| TW | 201310868 | 3/2013 |
| WO | WO-2017123441 A1 * | 7/2017 ............ B65G 23/06 |
| WO | WO 2019/167095 | 9/2019 |
| WO | WO 2019/167096 | 9/2019 |

OTHER PUBLICATIONS

International Search Report and the Written Opinion Dated Jul. 26, 2019 From the International Searching Authority Re. Application No. PCT/IT2019/050044. (14 Pages).
Rapporto di Ricerca e Opinione Scritta [Seach Report and Written Opinion] Dated Nov. 12, 2018 From the Ministero Dello Sviluppo Economico, Direzione Generale Sviluppo Produttivo e Competitivita, Uffico Italiano Brevetti e Marchi Re. Application No. IT201800003113. (7 Pages).
International Search Report and the Written Opinion Dated Jul. 26, 2019 From the International Searching Authority Re. Application No. PCT/IT2019/050043. (14 Pages).
Official Action Dated Oct. 30, 2023 from the US Patent and Trademark Office Re. U.S. Appl. No. 16/976,119. (42 pages).
Rapporto di Ricerca e Opinione Scritta [Search Report and Written Opinion] Dated Nov. 11, 2018 From the Ministero Dello Sviluppo Economico, Direzione Generale Sviluppo Produttivo e Competitivita, Ufficion Italiano Brevetti e Marchi Re. Application No. IT201800003111. (7 Pages).
Restriction Official Action Dated Apr. 5, 2023 from the US Patent and Trademark Office Re. U.S. Appl. No. 16/976,119. (6 pages).
Communication Pursuant to Article 94(3) EPC Dated Apr. 5, 2023 From the European Patent Office Re. Applciation No. 19709806.4. (6 Pages).
Decision of Examination Dated Aug. 18, 2022 From the Intellectual Property Office, Ministry of Economic Affairs of the Republic of Taiwan, R.O.C. Re. Application No. 11120697990 together with Translation into English. (18 Pages).
Decision of Examination Dated Aug. 18, 2022 From the Intellectual Property Office, Ministry of Economic Affairs of the Republic of Taiwan, R.O.C. Re. Application No. 11120700020 together with Translation into English (25 Pages).
Examination and Search Report Dated Jul. 15, 2022 From the Intellectual Property Office, Ministry of Economic Affairs of the Republic of Taiwan, R.O.C. Re. Application No. 108107078 and Its Translation Into English. (18 Pages).
Notice of Allowance Dated Apr. 10, 2024 together with Interview Summary Dated Mar. 26, 2024 from the US Patent and Trademark Office Re. U.S. Appl. No. 16/976,119. (21 Pages).
Notice of Allowance Dated Sep. 27, 2024 from the US Patent and Trademark Office Re. U.S. Appl. No. 16/976,119. (5 Pages).

* cited by examiner

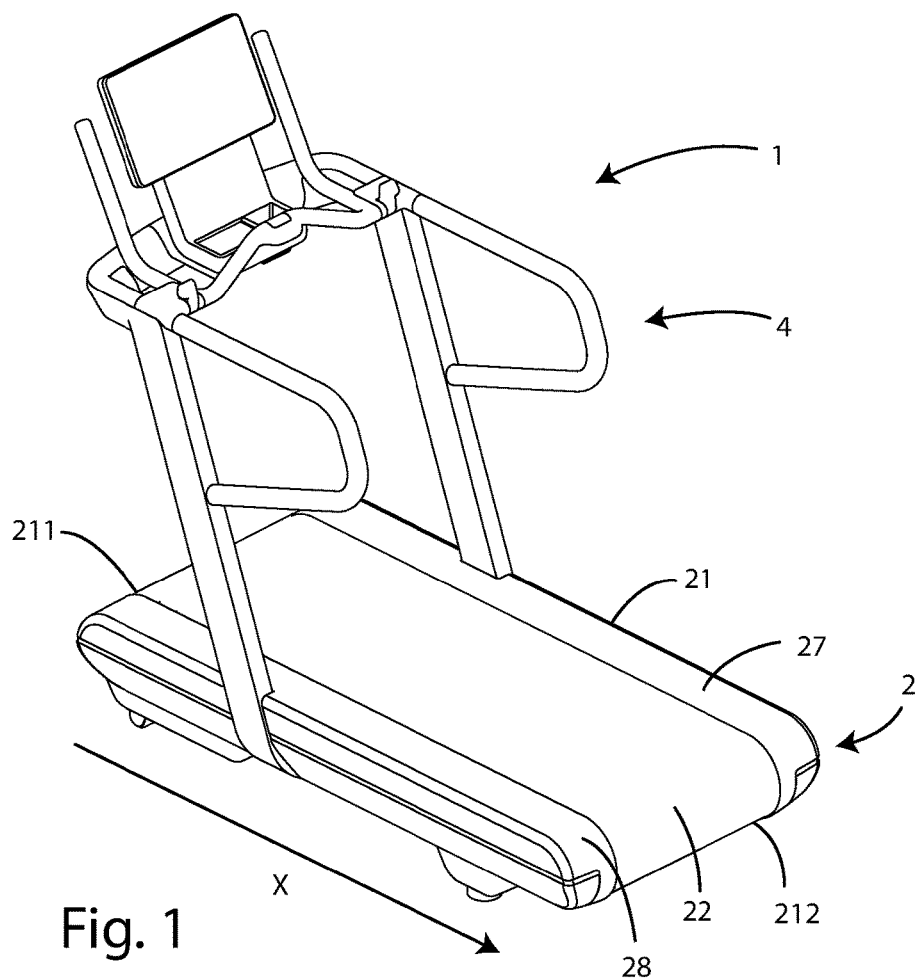
Fig. 1
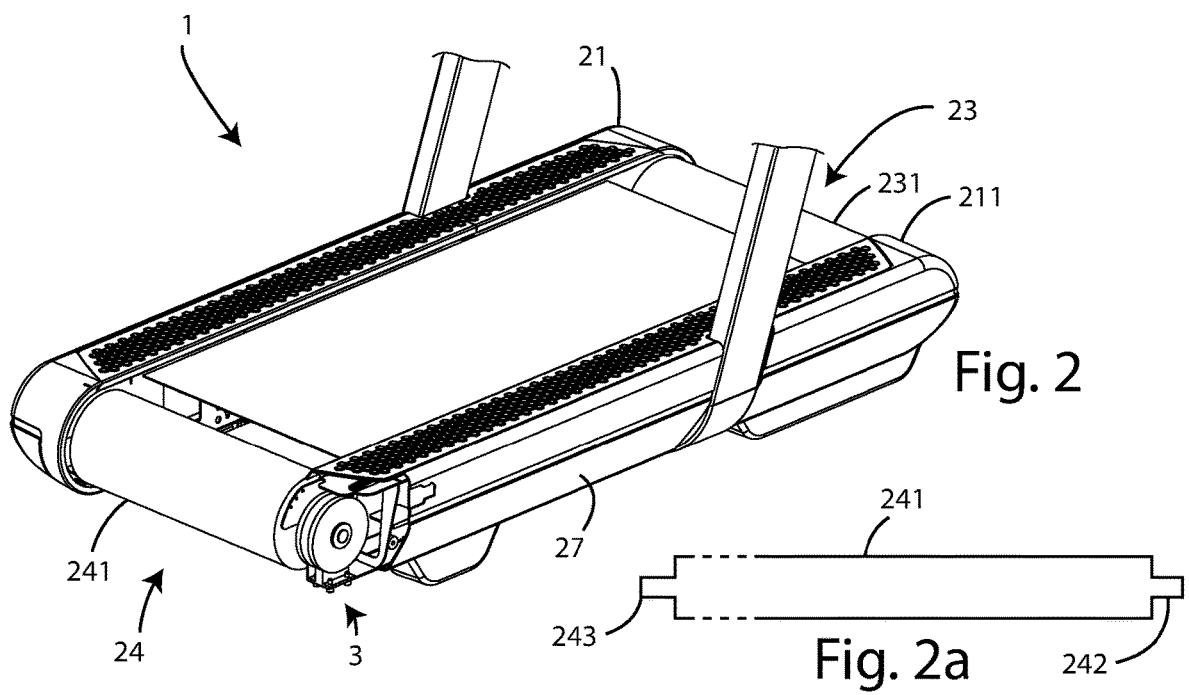
Fig. 2
Fig. 2a

TREADMILL WITH AXIAL ELECTRIC MOTOR

The present invention relates to an improved gymnastic machine/treadmill with closed circuit sliding belt.

In greater detail, the invention concerns a gymnastic machine with a closed circuit sliding belt which is an exercise surface and which enables the user to carry out gymnastic exercises such as running, walking and the like, which gymnastic machine includes technical solutions that make it very compact.

In these gymnastic machines, the sliding belt is moved by an electric motor, which moves a front or rear transmission cylinder which in its turn makes a sliding belt rotating.

This type of gymnastic machine is designed and realised in particular for carrying out gymnastic exercises, such as running or walking, where the user carrying out the exercise imparts an active force, but which can be used for any gymnastic exercise.

The description below relates to a sliding belt machine for carrying out gymnastic exercises of walking and running, but it is very apparent how the same should not be considered limited to this specific use.

As it is well-known, at present there exist gymnastic machines with a sliding belt comprising electric motors which set the sliding belt in rotation.

The electric motors at present installed on gymnastic machines with sliding belts of known type comprise complex kinematic chains, and rigid mechanisms for transformation and transmission of the drive that lead to large volumes and high degrees of wear among the parts.

Consequently, also the overall external structure of the gymnastic machine has considerable dimensions.

In particular, as the electric motor is positioned forward of the machine, it has a voluminous front structure.

This leads to a need to reserve adequate space in professional environments where the gymnastic machine is installed, such as gyms and the like.

In the domestic environment, on the other hand, the need to save space is even more essential.

A further disadvantage of gymnastic machines comprising electric motors of known type is due to yielding and wear of the mechanical components the known motor is made up of.

A still further disadvantage of gymnastic machines of known type is the fact that the electric motors installed reach maximum efficiency at a high revolution count and limited motor torques, so as to limit volumes, so it is not possible to couple the motor directly to the front or the rear cylinder.

In effect, in order to house the electric motors at present installed in these types of gymnastic machines, typically having a magnetic flow of radial type, it is necessary to include housings, with a relative hood, usually arranged forward of the sliding belt, which consequently increases the surface that the machine occupies.

Radial-flow motors, for this type of machine, are in general utilised for reasons of power and inertia. In particular, as regards the inertia, it must be prevented that while a user is walking on the belt and he accidentally switches the machine off, the belt itself blocks immediately, thus risking loss of balance for the user. On the other hand, it is advantageous to preserve a part of inertia in movement, so as to make more gradual the changes in speed of the belt and so as to gradually enable the user to adapt to such changes. In light of the above, the aim of the present invention is therefore to provide an improved gymnastic machine with sliding belt having a smaller volume.

A further aim of the present invention is to provide a gymnastic machine with sliding belt which requires fewer maintenance interventions.

Therefore the specific object of the present invention is a gymnastic machine comprising a base structure having a front transmission assembly and a rear transmission assembly, wherein said base structure comprises two lateral longitudinal members between which a sliding belt slides, a sliding belt, associated to said base structure, on which a user can perform a gymnastic exercise, wherein said sliding belt is configured to rotate by means of said front transmission assembly and rear transmission assembly according to a sliding direction, wherein said sliding belt is arranged between said two lateral longitudinal members and an electric motor, having at least one stator and at least one rotor, said electric motor being kinematically coupled to said front transmission assembly, or to said rear transmission assembly, for moving said sliding belt, said electric motor being of axial type.

Further according to the present invention, said stator is directly or indirectly fixed to one of said lateral longitudinal members.

Preferably according to the present invention, said at least one stator comprises a plurality of electric coils, and said electric motor comprises a drive shaft rotatably coupled to said stator.

Still according to the present invention, said electric motor comprises a first rotor, provided with a plurality of permanent magnets, keyed to said drive shaft, and a second rotor, provided with a plurality of permanent magnets, keyed to said drive shaft.

Further according to the present invention, said rear transmission assembly comprises a rear cylinder provided with a first appendix and a second appendix, and said first rotor is coupled to said first appendix.

Preferably according to the present invention, said first rotor and said second rotor are keyed on said drive shaft and said stator is arranged between said first rotor and second rotor.

Still according to the present invention, said drive shaft is coupled to said first appendix by means of coupling elements or shape couplings.

Further according to the present invention, said first rotor comprises a hub for coupling between said first appendix and said electric motor, and said second rotor is keyed on said hub.

Preferably according to the present invention, said rear transmission assembly comprises a rear cylinder, and said electric motor comprises at least one first rotor, provided with a plurality of permanent magnets, integrated in said rear cylinder.

Still according to the present invention, the machine comprises transmission means for transmission of the drive of said electric motor to said rear transmission assembly.

Further according to the present invention, said rear transmission assembly comprises a rear cylinder provided with a first appendix, and said transmission means comprise a transmission belt and a return pulley, solidly coupled to said first appendix.

Preferably according to the present invention, said axial electric motor is integrated in said rear transmission assembly.

Still according to the present invention, said axial electric motor comprises at least one rotor integrated in and joint to said rear cylinder.

Further according to the present invention, said lateral longitudinal member has a vertical wall having an opening, and said electric motor is installed at said opening, so as to enable passage at least of said drive shaft.

Preferably according to the present invention, said lateral longitudinal member comprises two supports arranged on the sides of said opening.

Still according to the present invention, said electric motor comprises a casing having a first flange, for fixing said electric motor to said vertical wall of said lateral longitudinal member.

Further according to the present invention, the machine comprises a second flange for the lateral regulation, for regulating the position of the electric motor with respect to one of said supports.

Preferably according to the present invention, rear circular portion of said electric motor is inserted through said opening afforded on said vertical wall of said lateral longitudinal member.

Still according to the present invention, said at least one rotor has a greater mass in the perimeter portion, to increase the inertia.

The present invention is now described, by way of example and without limiting the scope of the invention, with particular reference to the accompanying drawings, in which:

FIG. 1 shows an axonometric side view of the improved gymnastic machine with sliding belt, object of the present invention;

FIG. 2 shows a partially-exploded axonometric side view, of a detail of a first embodiment of the machine of FIG. 1;

FIG. 2a shows a schematic front view of a detail of FIG. 2;

The similar parts will be indicated in the various drawings with the same numerical references.

Figure 3:
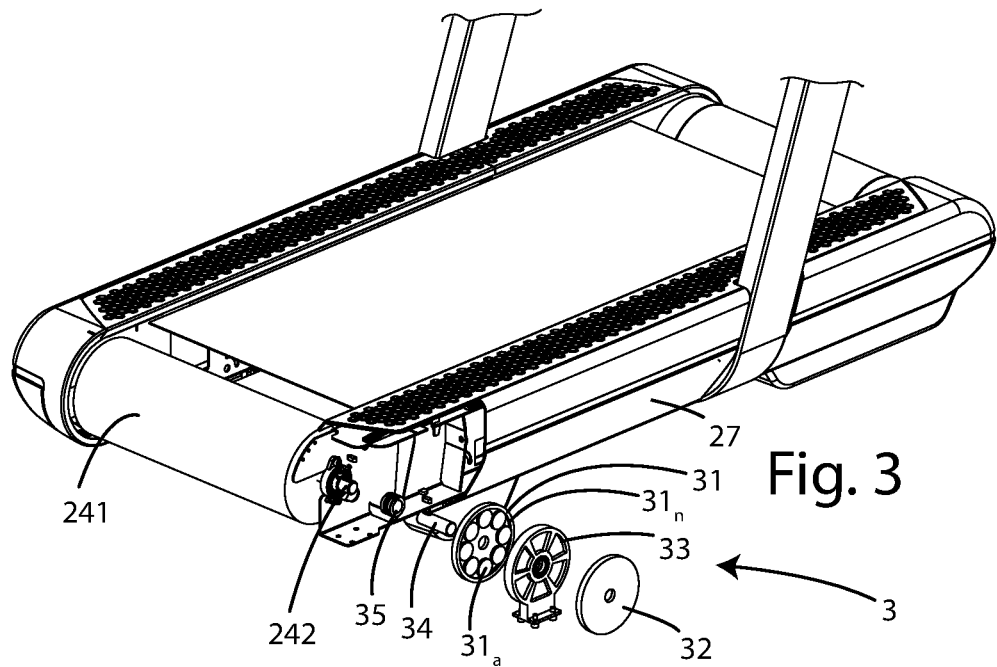
FIG. 3 shows an exploded side view of the axial motor shown in FIG. 2.

With reference to FIGS. 1 and 2, the improved gymnastic machine 1 with closed circuit sliding belt of the present invention is illustrated.

Said gymnastic machine 1 essentially comprises a base structure 2, having a frame 21, comprising a first 211 and a second end 212.

The frame 21 also comprises two lateral longitudinal members 27 and 28 that are parallel and between which a sliding belt 22 is mounted, according to a sliding direction X indicated by the axis X, which goes from said first end 211 towards the second end 212, by means of the drive force provided by an electric motor 3.

The gymnastic machine 1 further comprises a rest structure 4, coupled to said base structure 2, used by the user as a rest during the carrying-out of the gymnastic exercises.

Said sliding belt 22 is a continuous surface which slides in a closed circuit.

Said sliding belt 22 is moved by means of a front transmission assembly 23 arranged at said first end 211 of said frame 21, and a rear transmission assembly 24, arranged at said second end 212 of said frame 21.

In particular, said front transmission assembly 23 comprises a front cylinder 231 provided with appendices located at ends of said front cylinder 231, which have a diameter that is smaller than the diameter of the front cylinder 231.

Said appendices couple via coupling means, such as bearings, not visible in the figure, to said frame 21, so that the front cylinder 231 is mobile in rotation.

Likewise, also with reference to FIG. 2a, said rear transmission assembly 24 comprises a rear cylinder 241 provided with a first appendix 242 and a second appendix 243 located at the ends of said rear cylinder 241, which have a smaller diameter than the diameter of the rear cylinder 241.

Said appendices 242 and 243 couple via coupling means, such as bearings, not visible in the figure, to said frame 21, so that the rear cylinder 241 is mobile in rotation.

With reference in particular to FIG. 2, in a first embodiment of said gymnastic machine 1, said sliding belt 22 is moved by said electric motor 3, axially coupled to said rear transmission assembly 24, and in particular to said rear cylinder 241.

Alternatively, without forsaking the scope of protection of the present invention, said electric motor 3 can also be coupled to said front transmission assembly 23.

Said electric motor 3 is of axial or axial flow type.

Generally, from the structural point of view, the axial electric motors also comprise at least a fixed stator element and at least a rotor element which rotates with respect to the stator.

The electric coils are arranged and wound on the stator, while permanent magnets are arranged on the rotor.

In axial electric motors the magnetic field flow is directly parallel with respect to the axis of the motor.

The useful surfaces for the production of drive torque, i.e. the surfaces where the electric coils and permanent magnets are arranged, are perpendicular to the axis of the motor.

Different embodiments can be provided for an axial electric motor 3.

Figure 4:
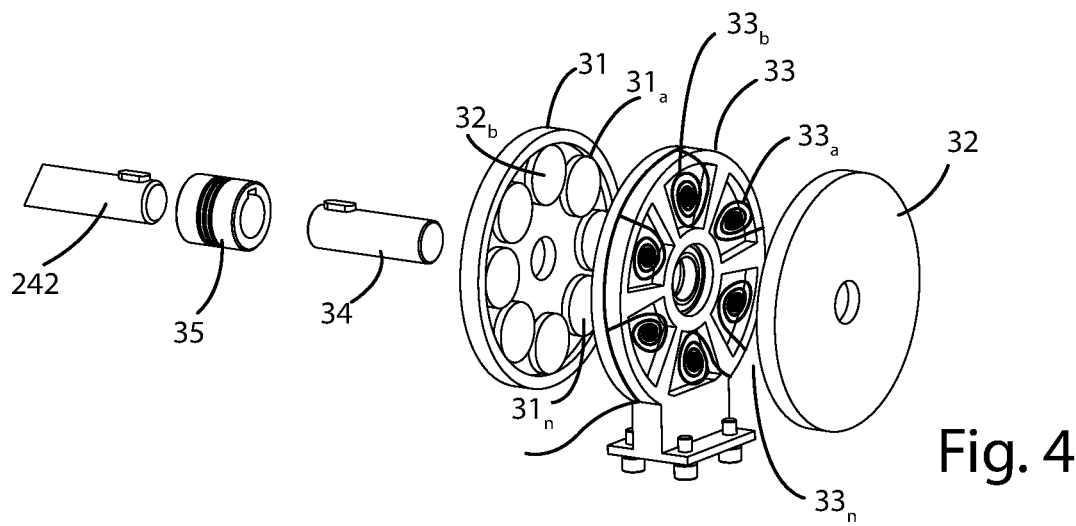
FIG. 4 shows an exploded view of the detail shown in FIG. 2.
Figure 5:
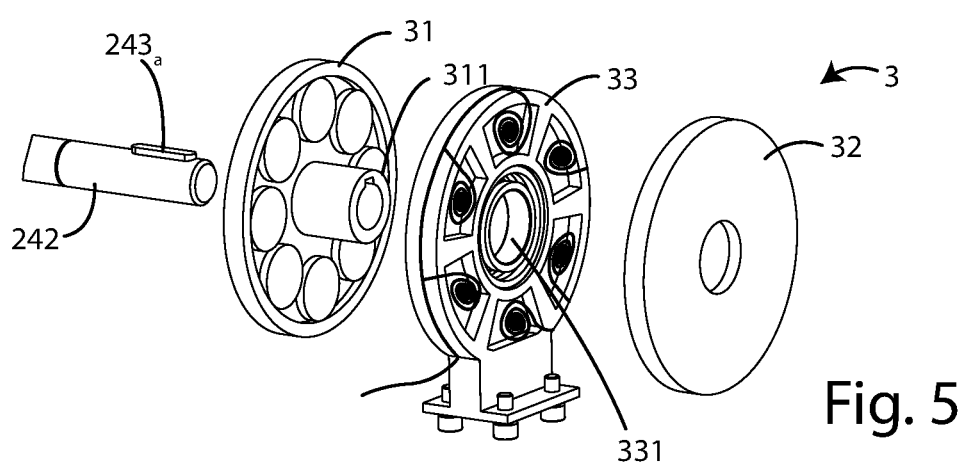
FIG. 5 shows an exploded side view of the axial motor shown in FIG. 2.

In the particular embodiment described in the present invention, with reference to FIGS. 3, 4 and 5, the axial electric motor 3 comprises a first rotor 31, a second rotor 32 and a stator 33 arranged between said first 31 and second 32 rotor.

Said stator 33, which has a central hole 331, is fixed to said frame 21, and in particular a lateral longitudinal member 27, as better described in the following, by means of fixing organs, and comprises a plurality of housings $33_a$, $33_b$, ..., $33_n$ for housing the electric coils.

With reference to FIG. 4, said first rotor 31 comprises a plurality of permanent magnets $31_a$, $31_b$, ..., $31_n$, alternated with south and north polarities, and likewise, said second rotor 32 comprises a plurality of permanent magnets $32_a$, $32_b$, ..., $32_n$, alternated with south and north polarities.

Without forsaking the scope of protection of the present invention, said plurality of permanent magnets can be arranged differently.

Said first rotor 31, second rotor 32 and stator 33 are arranged superposed. Said first rotor 31 and second rotor 32 are further keyed to the drive shaft 34, for example by means of a forced coupling.

Said drive shaft 34 is rotatably coupled to said stator 33, for example by means of a bearing at the central hole 331.

Said drive shaft 34 is coupled to said first appendix 242 of said rear cylinder 241 by means of shape couplings or by means of a torsional joint 35, so that they are solidly constrained to one another.

When the electric coils of said stator 33 are powered, the generated electromagnetic field interacts with said plurality of permanent magnets $31_a$, $31_b$, ..., $31_n$ of said first rotor and with said plurality of permanent magnets $32_a$, $32_b$, ..., $32_n$ of said second rotor 32, generating prevalently axial lines of magnetic field, parallel to the axis of extension of said rear cylinder 241, thus generating a drive torque which sets said first 31 and second rotor 32 in rotation, which in their turn set said torsional joint 35 and said rear cylinder 241 in rotation.

With reference to FIG. 5, it is also possible to provide a common shaft between said axial electric motor 3 and rear transmission assembly 24.

In particular, said first appendix 242 passes through said first rotor 31, stator 33 and second rotor 32, and it is keyed to said first rotor 31, by hooking means such as a tab $243_a$ which inserts in a grooved body 311 or hub, solidly constrained to said first rotor 31.

Said stator 33 is fixed to said frame 21 and in particular to one of said lateral longitudinal members 27 or 28, and is thus coupled to said hub 311, for example by means of a bearing, so that said hub 311 can rotate.

Said second rotor 32 is keyed on said hub 311 of the first rotor 31, so that when said drive torque exerted sets the first rotor 31 and second rotor 32 in rotation, the latter rotate solidly with said hub 311 and said rear cylinder 241.

Figure 6:
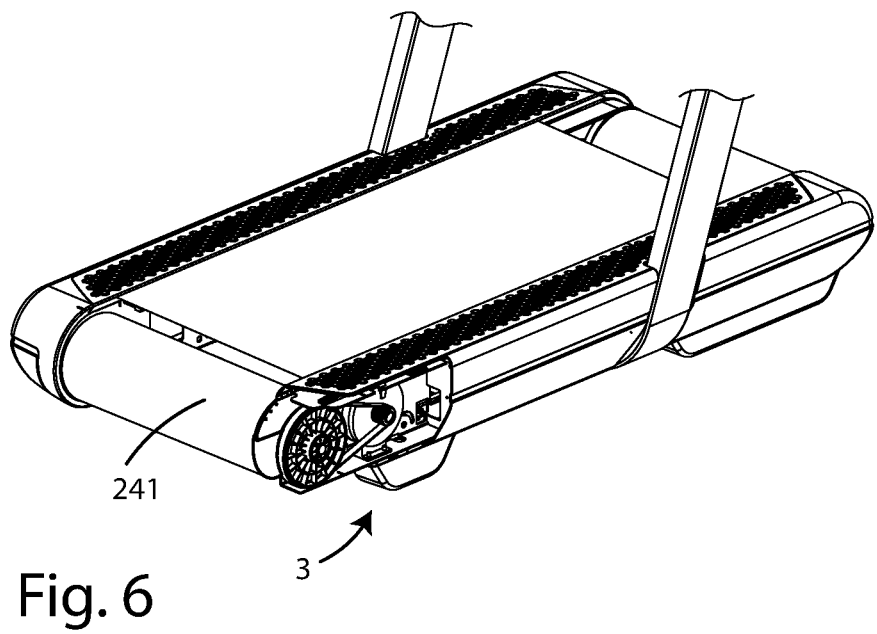
FIG. 6 shows an axonometric side view of a second embodiment of the gymnastic machine according to the present invention.
Figure 7:
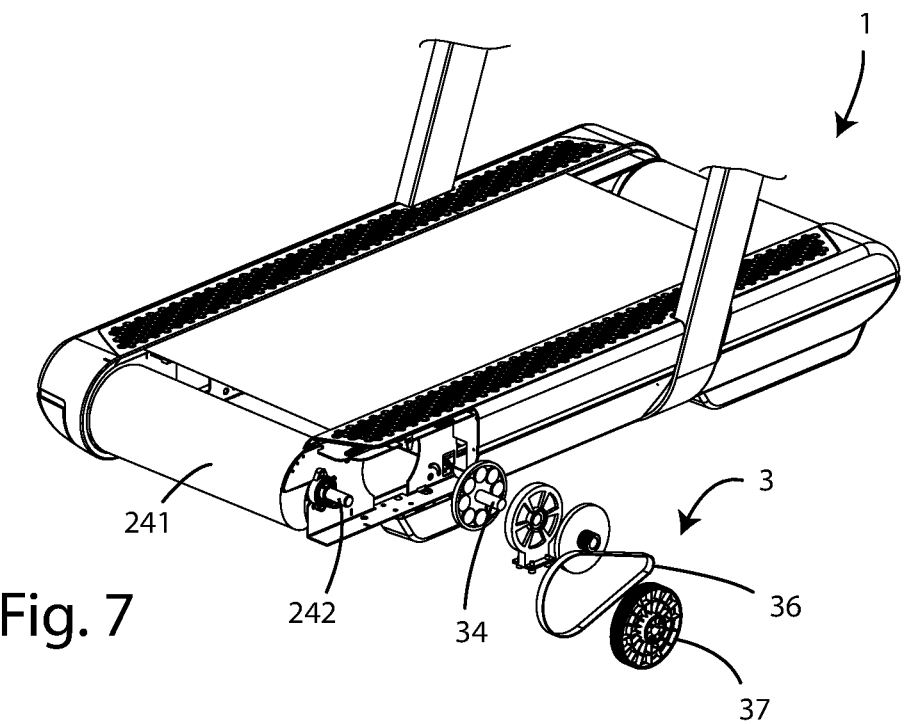
FIG. 7 shows a partially-exploded axonometric side view of the gymnastic machine according to FIG. 6.
Figure 8:
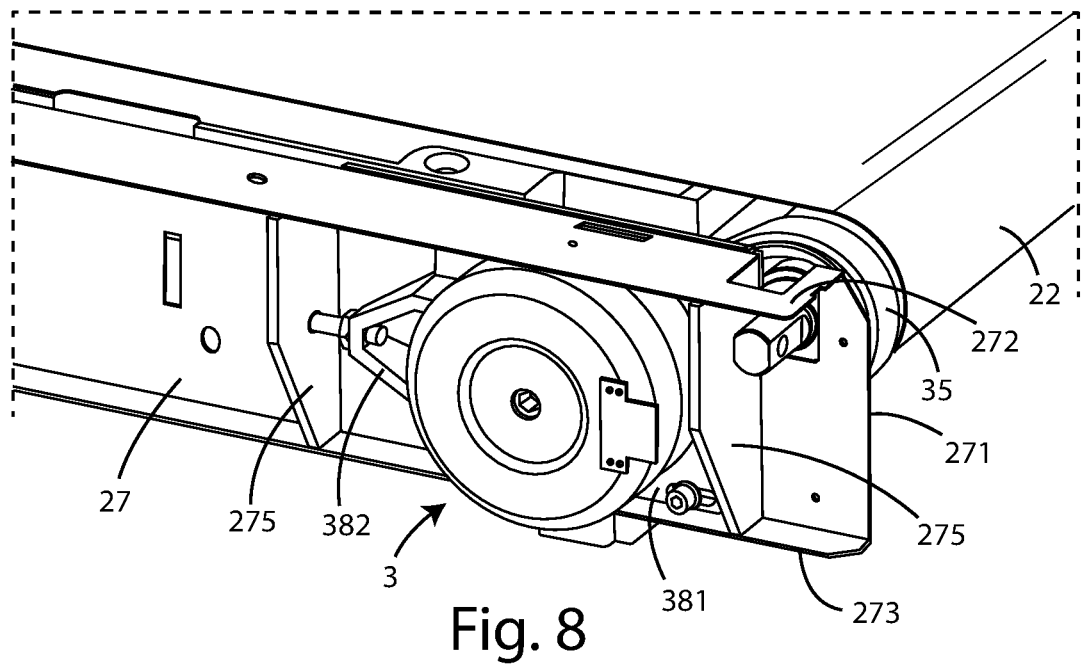
FIG. 8 shows a detail of the assembly of an axial electric motor in a lateral longitudinal member of the gymnastic machine according to FIG. 6.
Figure 9:
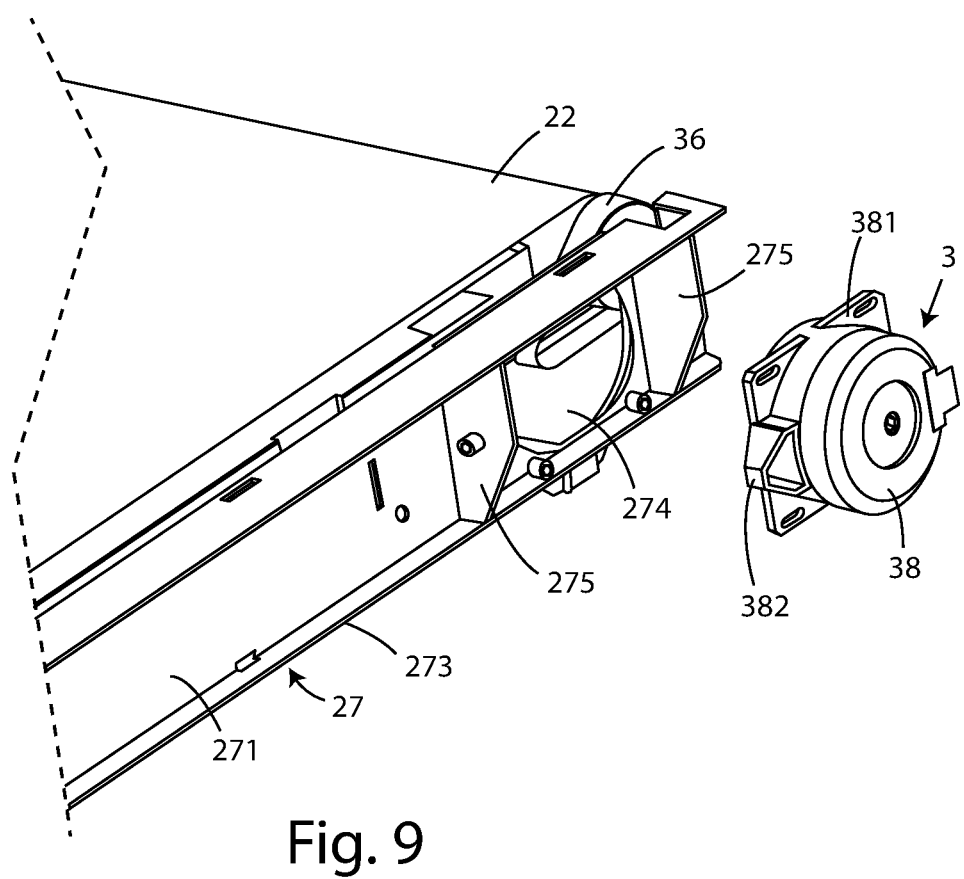
FIG. 9 shows a first partially-exploded axonometric view of the assembly of the axial electric motor in the lateral longitudinal member of the gymnastic machine according to FIG. 6.
Figure 10:
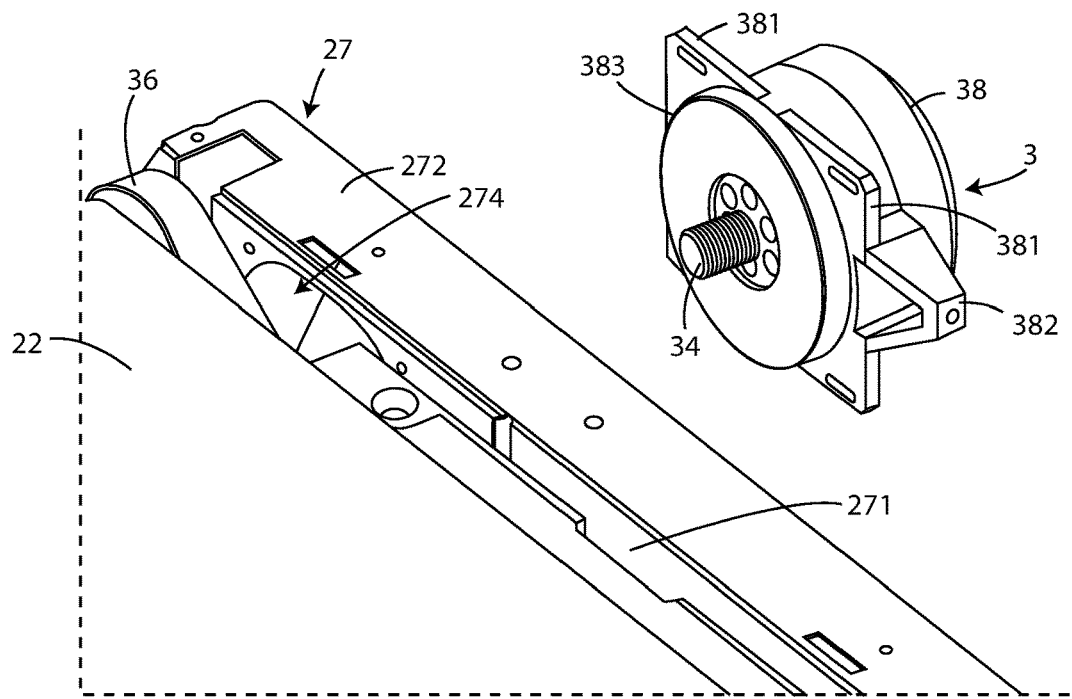
FIG. 10 shows a second partially-exploded axonometric view of the assembly of the axial electric motor in the lateral longitudinal member of the gymnastic machine according to FIG. 6.
Figure 11:
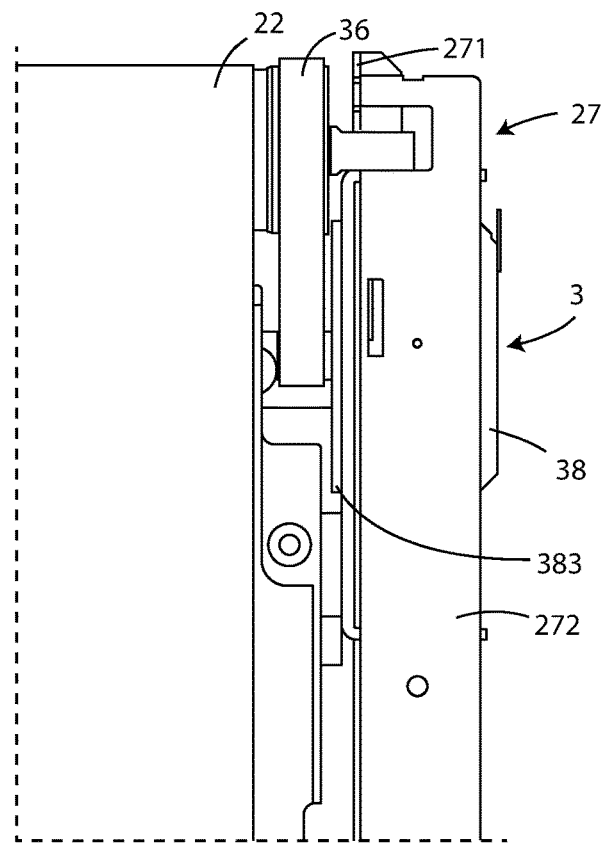
FIG. 11 shows a view from above of the detail shown in FIG. 8.
Figure 12:
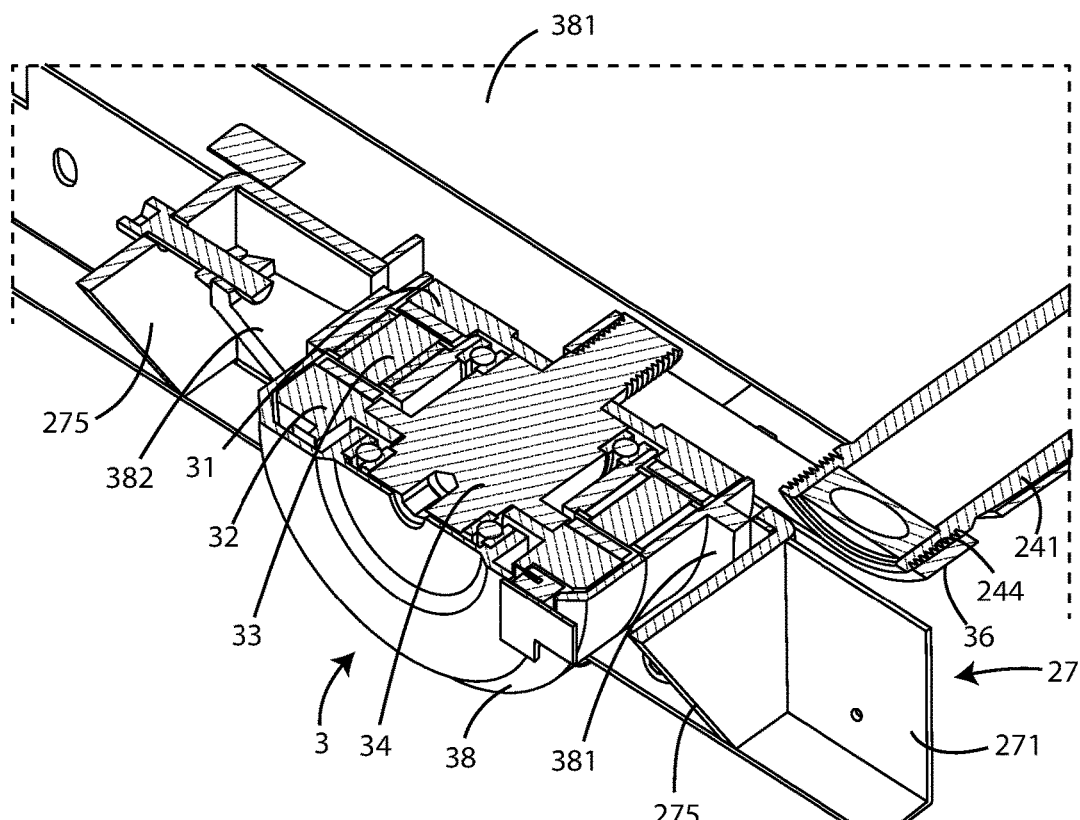
FIG. 12 shows a longitudinal section of the electric motor installed on the lateral longitudinal member of the gymnastic machine according to FIG. 8.
Figure 13:
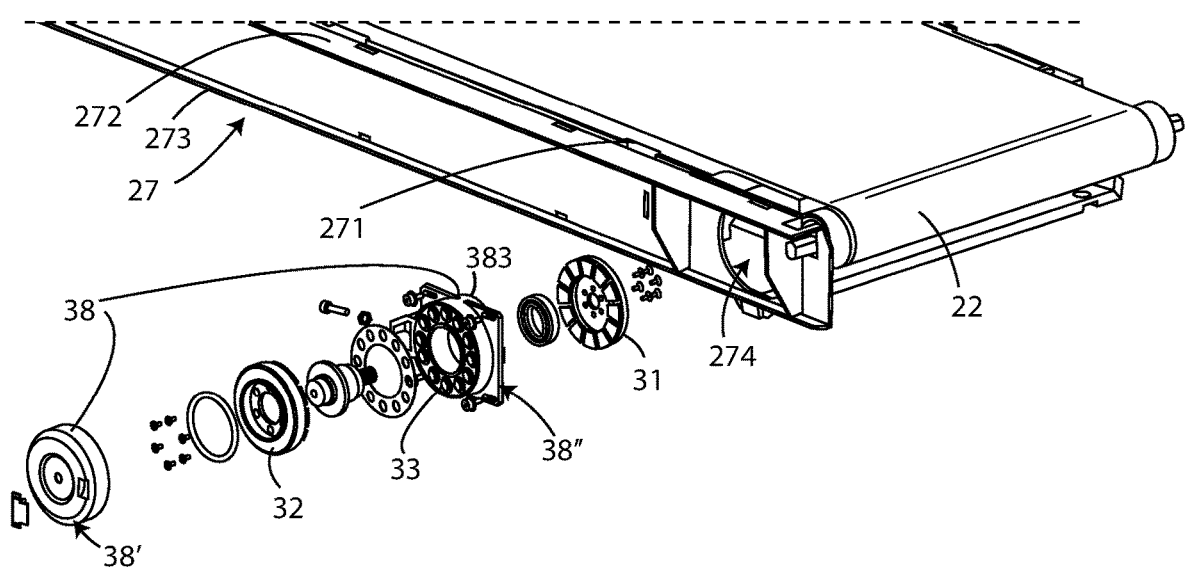
FIG. 13 shows an exploded view of the electric motor arranged at an opening afforded on a lateral longitudinal member.
Figure 14:
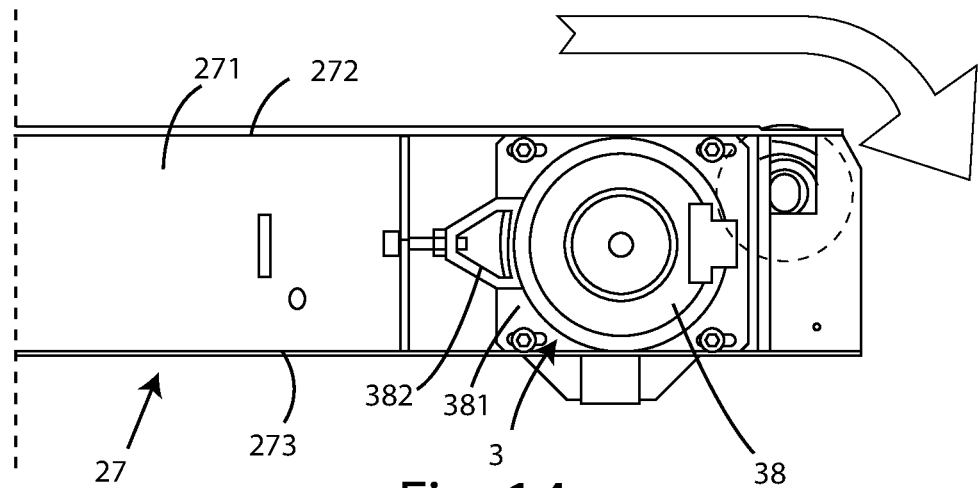
FIG. 14 shows a transparent side view of the detail shown in FIG. 8.

Now with reference to FIGS. 6 and 7, a second embodiment is shown of the gymnastic machine 1, wherein the coupling between said axial electric motor 3 and said rear transmission assembly 24 takes place by means of a transmission assembly or means, i.e. by means of a transmission belt 36 and a return pulley 37.

Said return pulley 37 is jointly coupled to said first appendix 242.

Said return pulley 37 and axial electric motor 3 are connected to one another by said transmission belt 36.

In the FIGS. 8-14 is shown a preferred embodiment regarding the installation of the axial electric motor 3 in the gymnastic machine 1, which enables obtaining an overall reduction of the space. In particular, the longitudinal member 27 has a vertical wall 271 and two walls 272 and 273 parallel and facing, arranged perpendicular to said vertical wall 271 and forming therewith a substantially C-shaped transversal section.

An opening 274 is afforded on the vertical wall 271, at which the electric motor 3 is arranged and inserted.

In particular, is viewed as the driving shaft 34 having a toothed part for coupling with a corresponding toothing 244 of the rear roller 241, by means of the transmission belt 36.

Both rotors 31 and 32 are keyed on the motor shaft 34.

Further, said opening 274 is laterally delimited by two supports 275. As the longitudinal members 27 (or 28) are subjected to considerable mechanical stresses during the gymnastic exercises, the arrangement of the electric motor 3 internally of one thereof, for obtaining an overall space saving of the gymnastic machine 1, can cause weakening thereof. Therefore said two supports 275 enable to increase the rigidity of the longitudinal element 27. Further, the electric motor 3 is closed in a die-cast casing 38 made in two parts 38' and 38", also comprising a first flange 381, for fixing the electric motor 3 with screws and corresponding holes obtained on the vertical wall 271 of the respective longitudinal member 27, and a second flange 382 for the lateral adjustment, for adjusting the position of the electric motor 3 with respect to one of said supports 275, for tensioning the transmission belt 36.

This configuration enables fixing the electric motor 3 to the longitudinal member 27. The die-cast casing 38 has a rear circular portion 383 that is cylindrical and it has a shape substantially similar to the shape of said opening 274 obtained on said vertical wall 271 of said longitudinal member 27.

The coupling modality of the die-cast casing 38 to the relative longitudinal member 27 by means of the first flange 381 has the function of supporting and stiffening the longitudinal member 27, together with the two supports 275.

As can be observed, owing to the smaller volumes of the electric motor 3, it is possible to realise an assembly housed internally of the footprint defined by the so-called "low part" which identifies the travel surface given by the sliding belt 22. In this way it is possible to do without the front hood, where the motor is usually housed.

In fact, to house the electric motor 3 on the flank, instead of in the front part of the gymnastic machine 1, it was necessary to interfere with the "structural continuity" of the lateral longitudinal member 27, by creating the opening 274 on the vertical wall 271, which is required to be rather large, in consideration of the width of the vertical wall 271.

The casing 38 of the electric motor 3 is conformed in such a way that, once fixed to the longitudinal member 27 by means of the flange 381 and respective four screws, the casing 38 "closes" the opening 274, restoring the torsional rigidity of the longitudinal member 27.

The dimension of said opening 274 enables entering with said rear circular portion 383 in said opening 274, which is located between the longitudinal member 27 and the sliding belt 22.

The coupling of the electric motor 3 to the longitudinal member 27 which takes place through said die-cast casing 38 is called indirect coupling.

With this configuration it is possible to exploit said rear circular portion 383, which has a large diameter, in order to house inertial mass useful in reaching a desired inertia value, by realising thicker rotors and thus, with a given diameter, with greater inertia.

As regards the necessary inertia which must be guaranteed on the gymnastic machine 1 according to the invention, in order to have a safety stop in the case, for example, of a sudden power failure of the electric motor 3, as well as to make the belt speed variations more gradual, indicating with IR the inertia required for the exercise machine 1, with IM the inertia of the motor axis and with T the transmission ratio between the electric motor 3 and the rear cylinder 241, the inertia that rotors must have is obtained from the formula:

$$IM = \frac{IR}{T^2}$$

The greater part of the motor inertia is given by the rotors 31 and 32. This is a novel element, as it enables eliminating any eventual second transmission stage necessary for driving only a flywheel, as with gymnastic machines according to the prior art.

Among other things, in order to maximise the inertia, the rotors 31 and 32 have a shape such that the part having the greatest thickness is the one furthest from the axis of rotation. In other words, on the more perimeter portions of the rotors 31 and 32 (i.e. with larger diameters) more mass is distributed, to have greater inertia with equal weight (refer in particular to FIG. 12).

Figure 15:
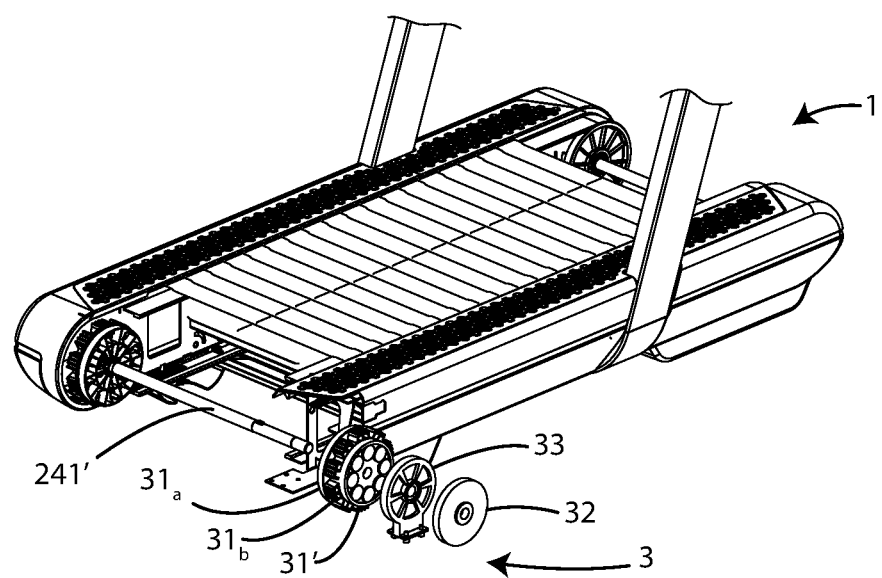
FIG. 15 shows a partially-exploded axonometric side view of a third embodiment of the machine of FIG. 1.
Figure 16:
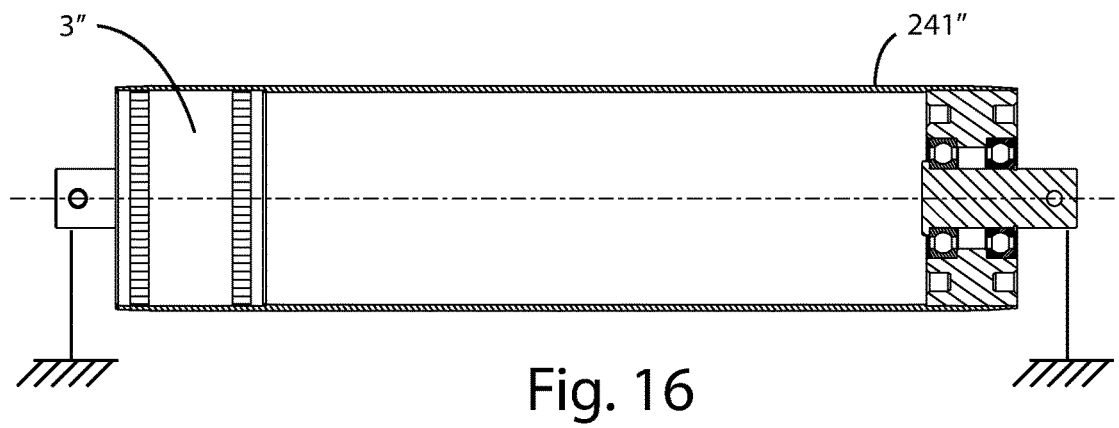
FIG. 16 shows a front view of a detail of a fourth embodiment of the machine of FIG. 1.

Now with reference to FIG. 15, in a third embodiment of the gymnastic machine 1, the coupling between said axial electric motor 3 and said rear transmission assembly 24 takes place by means of a first rotor 31' and a second rotor 32, said first rotor 31' being integrated in said rear cylinder 241' and said stator 33 being fixed to said frame 21 by fixing means.

This configuration enables keeping the dimensions of the gymnastic machine 1 modest, including laterally.

In particular, said rear cylinder 241' comprises a plurality of permanent magnets $31_a, \ldots, 31_n$ which interact with the magnetic field generated by the current that flows in said plurality of coils housed in said stator 33.

For this third embodiment also, couplings are provided between said first appendix 242 and said drive shaft 34 by means of a torsional joint 35 or by extending the first appendix 242 in said axial electric motor 3', thus providing said hub 311 and said tab $243_a$.

Figure 17:
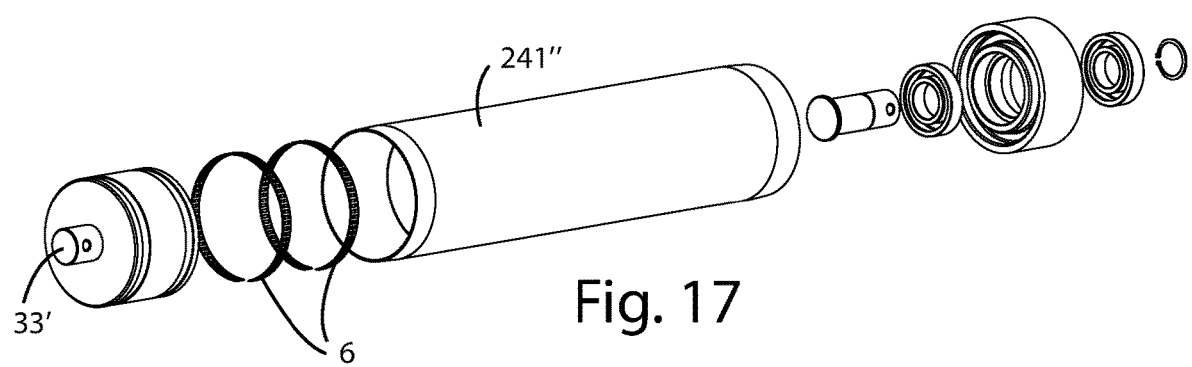
FIG. 17 is an exploded view of the detail shown in FIG. 16.

Now with reference to FIGS. 15 and 17, in a fourth embodiment of the gymnastic machine 1, said axial electric motor 3" is entirely integrated in said rear cylinder 241".

Said rear cylinder 241" is partially internally hollow and is rigidly coupled to the rotor of said axial motor 3", for example by keying organs 6.

The rotor is coupled in rotation to the stator.

Said stator 33' is fixed to said frame 21 by fixing means.

The operation of the improved sliding belt gymnastic machine 1 described above is as follows.

When a user intends to carry out a gymnastic exercise to train at speed or powerfully, he or she accedes to said gymnastic machine 1, by positioning on said sliding belt 22.

On the basis of the type of exercise selected, the sliding belt 22 moves activated by the axial electric motor 3 which sets the rear cylinder 241 in rotation.

The rotation of said rear cylinder 241 sets the front cylinder 231 and consequently the sliding belt 22 in rotation.

In the embodiment of the gymnastic machine 1, the current flowing in the electric coils of the stator 33 induces a magnetic field which interacts with the plurality of permanent magnets $31_a, 31_b, \ldots, 31_n$ of said first rotor 31 and the plurality of permanent magnets $32_a, 32_b, \ldots, 32_n$ of said second rotor 32 which thus begin rotating.

In particular, when the electric coils of said stator 33 are powered, the electromagnetic field generated interacts with said plurality of permanent magnets $31_a, 31_b, \ldots, 31_n$ of said first rotor and with said plurality of permanent magnets $32_a, 32_b, \ldots, 32_n$ of said second rotor 32, creating prevalently axial lines of magnetic field, parallel to the axis of extension of said rear cylinder 241, thus creating a drive torque which sets said first 31 and second rotor 32 in rotation.

When said first 31 and second 32 rotor rotate, they set said torsional joint 35 in rotation, which in turn sets said rear cylinder 241 in rotation, placing said sliding belt 22 in rotation, which also induces rotation in said front transmission assembly 23.

In the coupling by means of said tab $243_a$, as described in the foregoing, the drive torque exerted sets the first rotor 31 and second rotor 32 in rotation, and the latter rotate solidly with said hub 311 and said rear cylinder 241.

In the second embodiment of the gymnastic machine 1, the movement of said first rotor 31 and second rotor 32 set the return pulley 37 in rotation by means of the transmission belt 36.

The rotation of said return pulley 37 places said rear cylinder 241 in rotation, which transmits the drive to the other elements as described for the first embodiment.

In the third embodiment, the magnetic field induced by the current flowing in said coils housed in said stator 33 excites the plurality of permanent magnets $31_a, \ldots, 31_n$ housed in said rear roller 241' and the plurality of permanent magnets $32_a, \ldots, 32_n$ housed in said second rotor 32 which thus by rotating place the other elements in rotation as described in the foregoing.

In the fourth embodiment, the magnetic field induced by the current flowing in said coils housed in said stator 33' excites the plurality of permanent magnets $31a, \ldots, 31n$ housed in said rear roller 241", which thus by rotating places the other elements in rotation as described in the foregoing.

The structure of the electric axial motor 3 described with reference to FIGS. 8-14, can be conveniently installed in each of the first, second and third embodiments above described, installing it in the respective structure of the longitudinal member 27, using different operating modes.

For example, the rotors 31 and 32 or at least one of them of FIG. 4 may have a shape such that the part having greater thickness and greater mass is the one furthest from the axis of rotation (i.e. farthest from the center), thus having a greater inertia with equal weight. This has the advantage of eliminating a second transmission stage necessary to set in motion a flywheel, as in the gymnastic machines according to the prior art.

As is clear from the above description, said improved gymnastic machine with sliding belt comprises an axial electric motor which enables a reduction of the volume of the machine and less wear on the mechanical components.

The axial electric motor present in the machine object of the invention is characterised by high efficiency, even at low revolutions, providing high drive torques, so that it can be directly coupled to the rear cylinder or the front cylinder.

The axial electric motor enables obtaining high specific drive torque, even with smaller dimensions/volume as the active parts are located close to the external circumference and therefore distant from the rotation axis.

The present invention is described by way of example only, without limiting the scope of application, according to its preferred embodiments, but it shall be understood that the invention may be modified and/or adapted by experts in the field without thereby departing from the scope of the inventive concept, as defined in the claims herein.

The invention claimed is:

1. A treadmill, comprising:

a base structure having a front transmission assembly and a rear transmission assembly, wherein said base structure comprises two lateral longitudinal members between which a sliding belt slides;

wherein said sliding belt is associated to said base structure;

wherein said base structure is configured for a user to perform a gymnastic exercise;

wherein said sliding belt is configured to rotate by said front transmission assembly and rear transmission assembly according to a sliding direction (X), wherein said sliding belt is arranged between said two lateral longitudinal members;

an electric axial motor, having at least one stator and two rotors, said electric axial motor being kinematically coupled to said front transmission assembly or to said rear transmission assembly for moving said sliding belt;

wherein said electric axial motor is of axial flow type and a magnetic field flow is directed parallel with respect to an axis of the electric axial motor;

wherein the electric axial motor is arranged internally of one of the lateral longitudinal members;

wherein said at least one stator is directly or indirectly fixed to one of said lateral longitudinal members;

wherein said two rotors comprises a first rotor, keyed to a drive shaft or an appendix of the rear transmission assembly, and a second rotor provided with a plurality of permanent magnets, keyed to said drive shaft or said first rotor;

wherein said rear transmission assembly comprises a rear cylinder; and wherein said first rotor is provided with a plurality of permanent magnets and is integrated in said rear cylinder.

* * * * *